Patented Mar. 26, 1946

2,397,083

UNITED STATES PATENT OFFICE 2,397,083

BONDING VERMICULITE

Harry T. Bellamy, Evanston, Ill.

No Drawing. Application October 30, 1940,
Serial No. 363,485

11 Claims. (Cl. 106—122)

My invention relates to the coating of expanded vermiculite particles with powdered binders and the subsequent union of these coated particles to form coatings and structures for heat insulation and sound deadening purposes.

Expanded vermiculite, which, for brevity, will hereinafter be referred to as vermiculite, is well known in the insulation art. It is produced by heating the sized particles of vermiculite ore, a micaceous mineral having laminated plate structure and water of hydrations which turns to steam on heating, forcing the plates apart. In a good grade of vermiculite there is some cohesion of the plates near their central areas, but the edges of the expanded vermiculite particle are always more or less separated like the edges of a partially opened book.

The described structure of vermiculite particles would seem to explain the observed fact that, in bonding vermiculite particles with fluid bonding material, some of the bonding material always seeps in between the plates or leaves and becomes ineffective for holding the particles together. The result of this action is not only to increase the amount of bonding material required but to produce a heavier composition with lower insulating value and greatly to increase raw material cost.

In using fluid binders as heretofore suggested, there is an added problem which arises as a result of the stirring and agitation required to mix the vermiculite particles with the fluid binders. During this operation, the particles flake apart to a pronounced extent and break up into smaller flakes than is desired for light weight well bonded insulation. This again adds to the amount of binder required and deleteriously affects the character of the final product.

An object of my invention is to overcome the disadvantages encountered in bonding vermiculite with fluid binders such as molten asphalt, emulsified asphalt, sodium silicate and the like by providing dry coatings of bonding materials to be subsequently made effective.

Another object of my invention is to provide means for making these dry bond coatings active so that, when the coated particles are brought in contact, they will adhere.

Other specific objects and features of my invention will be apparent from a consideration of the following description.

In accordance with the main features of my invention, I select a suitable vermiculite aggregate, such as one of the commercial grades, but preferably one ranging in size from 10 to 4 mesh and having bulk densities ranging from 5½ to 8 pounds per cubic foot. I place the particles or granules of vermiculite in a machine where they may be tumbled without too violent agitation. The particles being tumbled are sprayed with a material which is a viscous semi-solid material at normal temperatures so that when the semi-solid material deposits on the vermiculite particles it will remain on the surface and not seep between the plates or leaves. Other requirements of this preliminary coating material is that it will adhere to the vermiculite particles, serve as a coating to which pulverulent material will adhere, and, while it is not intended to be instrumental in amalgamating the bond, it should not be detrimental to the bonding action. After the vermiculite particles have received the viscous coating, the powdered bonding material is sifted onto the particles while tumbling until suitably coated.

Illustrative of the type of preliminary coating material of semi-solid consistency at ordinary room temperatures is ordinary petrolatum. This material may be heated sufficiently to make it fluid to partially fluid, and when sprayed onto the vermiculite particles at relatively low spraying pressures, it strikes the vermiculite in the form of relatively small solid to semi-solid particles which adhere to the outside surface and do not penetrate. If the coating material is sprayed in a fluid condition and is still partially fluid when it strikes the vermiculite, it still has the property of congealing on the surface so that there is a sufficient temperature range in which to operate that the practice of the invention does not require such critical control as to be difficult to perform on a regular commercial basis.

The coating material used is one which has the general properties of petrolatum. Preferably it is a mixture of hydrocarbon constituents having a range of melting points such as to give it a plastic range at ordinary temperatures, such as room temperature, at which the coating operation will be performed. The coating material should be compatible also with the bonding material; e. g., they should wet each other, should not affect each other chemically, the bonding material in the form of powder should readily adhere to the preliminary coating material, and the coating material should not affect adversely the subsequent action of the bonding material in bonding the vermiculite particles together or to a surface such as a building wall. Depending upon the bonding material used, the coating material may be a mixture, semi-solid to plastic at room temperature, of various hydrocarbons, high molecular weight alcohols, fatty acids, ketones, esters, ethers, waxes, pitches, heavy wax-like greases, certain gelatinous material, or the like, having relatively long carbon chains. For most purposes, however, I prefer to use petrolatum, a relatively crude grade of which is inexpensive and functions for the purpose very well.

The bonding material is preferably powdered asphalt, but substituent materials of the same general character may be used which have the property of being pulverulent at ordinary temperatures but may be plasticized by heat or in other ways to produce a bonding action. Various resins may be employed, various other thermoplastic substances, and other such materials, the number of which is being added to from time to time by research chemists. Methyl methacrylate resin is illustrative of one of these relatively new materials. For practical commercial purposes, however, due to its low cost and excellent properties, I prefer to use a bituminous asphalt having a melting temperature of the order of 275 degrees F. to 300 degrees F.

The product resulting from the treatment of the vermiculite particles with the coating material and subsequent addition of the powdered bonding material is a pourable material, the granules of which may be caused to adhere in a variety of ways. This product may be produced at a central point, and may be used in various ways for its intended purpose, as will be clear from subsequent illustrative examples.

As a specific example of one way of carrying out my invention, I take 60 parts by weight of vermiculite ranging in size between 4 and 10 mesh and having a bulk density of six pounds per cubic foot. Operating at ordinary room temperature and while tumbling the vermiculite slowly, 10 parts by weight of petrolatum are sprayed thereon and caused to congeal on the surface of the vermiculite particles as a non-liquid coating. The petrolatum may be raised to a temperture of about 125 degrees F. to facilitate spraying, but, even at room temperature, it may be broken up into small particles which will adhere to the vermiculite when they contact it. The coated vermiculite product is then tumbled with 30 parts by weight of powdered asphalt having a melting point of approximately 275 degrees to 300 degrees F. This produces a pourable mass of coal black particles comprising vermiculite having a uniform layer of powdered asphalt on the outside surface. This product may be used in many ways.

As a further illustrative example, the product resulting from the above treatment is introduced into molds and heated to a temperature of 250 degrees F. to 300 degrees F. to render the asphalt tacky or plastic. The mass in the mold is compressed, e. g., about 20%, cooled, and the resulting composition has a density of about 14 pounds per cubic foot, adequate strength and excellent insulating value. I may, however, treat the coated granules as prepared above by spraying with about 10 to 15 pounds by weight of naphtha or other solvent to render the asphalt tacky, then place in a mold, compress and dry out the solvent to produce a composition having approximately the above density and insulating value. The exact amount of solvent used depends upon the extent to which its evaporation may be prevented while it is being applied, the degree of tackiness desired, the solvent used, and other factors. The amount of solvent used should not be great enough to fluidify the asphalt and permit its entering the interstices of the exfoliated vermiculite.

I am aware that the coating of granules with bonding material prior to conglomeration is not new, but all previous methods have been objectionable in some way or other so that they have not gone into extensive commercial use. The products produced have not been such that full advantage could be taken of the known desirable properties of vermiculite. The proposed use of liquid for coating vermiculite granules is, as a part of a bonding operation, objectionable because too much liquid is absorbed by them in providing an adhesive surface. By employing petrolatum and powdered asphalt, I not only produce an excellent material but also one of sufficiently low cost that it is commercially very desirable in the fields in which it is adapted for use.

My invention has been described in detail in order that those skilled in the art may practice the same, but the scope of the invention is limited only by the appended claims.

What I claim as new and desire to protect by Letters Patent of the United States is:

1. A composition for molding, comprising expanded vermiculite granules, said granules being coated with a pulverulent heat plasticizable organic binder attached to the vermiculite through a layer of viscous semi-solid material, said semi-solid material coating but not substantially impregnating the granules of expanded vermiculite.

2. A composition for molding, comprising expanded vermiculite granules, said granules being coated with a pulverulent thermoplastic bituminous binder attached to the vermiculite through a layer of viscous semi-solid material, said semi-solid material coating but not substantially impregnating the granules or expanded vermiculite.

3. A composition for molding, comprising expanded vermiculite granules, said granules being coated with pulverized asphalt solid at room temperature but plasticisable by means of heat, said asphalt being attached to the vermiculite through a layer of viscous semi-solid material, said semi-solid material coating but not substantially impregnating the granules of expanded vermiculite.

4. A composition for molding, comprising expanded vermiculite granules, said granules being coated in general with pulverized high melting point asphalt attached to the vermiculite through a layer of viscous petrolatum.

5. A method for producing a molded vermiculite composition, which comprises treating expanded vermiculite granules to produce a viscous coating thereon without, however, substantially impregnating said vermiculite granules, and then contacting the said coated granules with a pulverulent organic thermoplastic binder to cause said pulverulent binder to adhere to said coated granules.

6. A method for producing a molded vermiculite composition which comprises treating expanded vermiculite granules to produce a viscous coating thereon without, however, substantially impregnating said vermiculite granules, mixing the thus coated granules with a pulverulent organic plasticizable binder, converting the binder to the plastic state, compressing the granules together into a compact mass, and rendering the binder non-plastic.

7. A method for producing a molded vermiculite composition, which comprises depositing a viscous semi-solid material on the surface of expanded vermiculite granules without, however, substantially impregnating said vermiculite granules, mixing the thus coated granules with powdered asphalt, heating the asphalt to the plastic state, bringing the granules together in a compact mass, and cooling to render the asphalt non-plastic.

8. A method of producing a molded vermiculite composition, which comprises depositing viscous petrolatum on the surface of expanded vermiculite granules, tumbling the thus coated granules with powdered asphalt, applying heat to render the asphalt plastic, and cooling to render the asphalt non-plastic.

9. A method of producing a molded vermiculite composition, which comprises spraying melted petrolatum on expanded vermiculite granules at substantially room temperature while slowly tumbling the same, whereby the said petrolatum is caused to congeal on the surface of said granules as a tacky coating but without appreciably impregnating the pores of the said expanded vermiculite, tumbling said coated particles with a sufficient proportion of powdered high melting point asphalt to cause the said powdered asphalt to adhere to said tacky coating and coat the said granules, pressing a portion of the granules so coated to a desired form while heating the same sufficiently to cause the asphalt to become plastic and allowing the resulting molded form to cool.

10. A method of producing a molded vermiculite composition, which comprises spraying melted petrolatum on expanded vermiculite granules at substantially room temperature while slowly tumbling the same, whereby the said petrolatum is caused to congeal on the surface of said granules as a tacky coating but without appreciably impregnating the pores of the said expanded vermiculite, tumbling said coated particles with about 30% by weight of powdered high melting point asphalt to cause the said powdered asphalt to adhere to said tacky coating and coat the said granules, pressing a portion of the granules so coated to a desired form while heating the same sufficiently to cause the asphalt to become plastic and allowing the resulting molded form to cool.

11. A method of producing a molded vermiculite composition, which comprises spraying melted petrolatum on expanded vermiculite granules at substantially room temperature while slowly tumbling the same, whereby the said petrolatum is caused to congeal on the surface of said granules as a tacky coating but without appreciably impregnating the pores of the said expanded vermiculite, tumbling said coated particles with about 30% by weight of powdered high melting point asphalt to cause the said powdered asphalt to adhere to said tacky coating and coat the said granules, pressing a portion of the granules so coated to a desired form while heating the same sufficiently to cause the asphalt to become plastic and allowing the resulting molded form to cool, the said powdered asphalt applied to the said tacky coating having a melting temperature of between about 275 degrees F. and about 300 degrees F.

HARRY T. BELLAMY.